US009252912B2

(12) United States Patent
Xia et al.

(10) Patent No.: US 9,252,912 B2
(45) Date of Patent: Feb. 2, 2016

(54) METHOD FOR ROUTING AND SPECTRUM ASSIGNMENT

(75) Inventors: Ming Xia, Milpitas, CA (US); Stefan Dahlfort, Santa Clara, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 258 days.

(21) Appl. No.: 13/542,295

(22) Filed: Jul. 5, 2012

(65) Prior Publication Data

US 2013/0266316 A1  Oct. 10, 2013

Related U.S. Application Data

(60) Provisional application No. 61/621,879, filed on Apr. 9, 2012.

(51) Int. Cl.
*H04J 14/00* (2006.01)
*H04Q 11/00* (2006.01)
*H04J 14/02* (2006.01)

(52) U.S. Cl.
CPC ......... *H04J 14/0257* (2013.01); *H04J 14/0267* (2013.01); *H04Q 11/0066* (2013.01); *H04Q 11/0067* (2013.01); *H04Q 2011/0064* (2013.01); *H04Q 2011/0086* (2013.01)

(58) Field of Classification Search
CPC .......................................... H04J 14/00–14/0298
USPC .................................................... 398/43–103
See application file for complete search history.

(56) References Cited

U.S. PATENT DOCUMENTS

| 4,809,362 | A  | 2/1989  | Claus et al.  |
|-----------|----|---------|---------------|
| 5,301,053 | A  | 4/1994  | Shikada       |
| 6,067,288 | A  | 5/2000  | Miller et al. |
| 6,493,117 | B1 | 12/2002 | Milton et al. |
| 6,567,429 | B1 | 5/2003  | DeMartino     |
| 6,633,695 | B2 | 10/2003 | Bailey et al. |

(Continued)

FOREIGN PATENT DOCUMENTS

| EP | 1703762 A2    | 9/2006  |
|----|---------------|---------|
| WO | WO 00/76105 A1| 12/2000 |

(Continued)

OTHER PUBLICATIONS

Patel: "Routing, Wavelength Assignment, and Spectrum Allocation in Wavelength-Convertible Flexible Optical WDM (WC-FWDM) Networks", OFC/NFOEC 2012, Mar. 4, 2012, pp. 1-3.*

(Continued)

*Primary Examiner* — Li Liu

(57) ABSTRACT

Methods and apparatus are disclosed for performing a spectrum assignment and route selection algorithm in an optical WDM network. The optical WDM is assigned an optical band of frequencies. In accordance to the present invention, a new spectrum assignment in the optical band always adjoins a spectrum assignment previously allocated. The very first spectrum assignment may be made to start with one end frequency in the optical band. Given a spectrum demand, one or more spectrum assignments are identified and one or more feasible routes are determined. Among the one or more feasible routes, an optimal route may be selected based on a set of pre-defined criteria. The spectrum assignment and route selection algorithm disclosed herein reduces computational complexities and improves spectrum efficiencies.

16 Claims, 8 Drawing Sheets

(56) References Cited

U.S. PATENT DOCUMENTS

| | | |
|---|---|---|
| 6,687,463 B1 | 2/2004 | Hutchison et al. |
| 6,754,403 B1 | 6/2004 | Schmid |
| 6,970,617 B2 | 11/2005 | Mao et al. |
| 7,024,116 B2 | 4/2006 | Orbach et al. |
| 7,181,095 B1 | 2/2007 | Meli et al. |
| 7,184,666 B1 | 2/2007 | Li et al. |
| 7,200,331 B2 | 4/2007 | Roorda et al. |
| 7,450,847 B1 | 11/2008 | Frigo et al. |
| 7,483,636 B2 | 1/2009 | Aoki et al. |
| 7,546,043 B2 | 6/2009 | Kai et al. |
| 7,599,620 B2 | 10/2009 | Graves et al. |
| 7,657,181 B2 | 2/2010 | Terai et al. |
| 7,860,396 B2 | 12/2010 | Claringburn et al. |
| 8,521,024 B2 | 8/2013 | Wellbrock et al. |
| 8,693,880 B2 | 4/2014 | Sakauchi et al. |
| 2001/0046350 A1 | 11/2001 | Tedesco |
| 2001/0051019 A1 | 12/2001 | Bailey et al. |
| 2002/0191250 A1 | 12/2002 | Graves et al. |
| 2004/0052530 A1 | 3/2004 | Tian et al. |
| 2004/0141746 A1 | 7/2004 | Oberg |
| 2004/0153492 A1 | 8/2004 | Cao et al. |
| 2004/0165891 A1 | 8/2004 | Kopelovitz et al. |
| 2004/0184809 A1 | 9/2004 | Miyata et al. |
| 2004/0197099 A1 | 10/2004 | Kai et al. |
| 2004/0212897 A1 | 10/2004 | Tedesco |
| 2005/0025489 A1 | 2/2005 | Aldridge et al. |
| 2005/0084262 A1 | 4/2005 | Oberg et al. |
| 2005/0259571 A1 | 11/2005 | Battou |
| 2005/0275921 A1 | 12/2005 | Haus et al. |
| 2006/0110162 A1 | 5/2006 | Tian et al. |
| 2006/0275034 A9 | 12/2006 | Way et al. |
| 2007/0212068 A1 | 9/2007 | Miyazaki et al. |
| 2008/0013950 A1 | 1/2008 | Boudreault et al. |
| 2008/0044184 A1 | 2/2008 | Popovic |
| 2008/0317466 A1 | 12/2008 | Chung et al. |
| 2009/0047019 A1 | 2/2009 | Palacharla et al. |
| 2009/0052896 A1 | 2/2009 | Kazawa et al. |
| 2009/0110402 A1 | 4/2009 | Bernstein et al. |
| 2009/0220228 A1 | 9/2009 | Popovic |
| 2010/0014859 A1 | 1/2010 | D'Alessandro et al. |
| 2010/0209038 A1 | 8/2010 | Popovic et al. |
| 2011/0135305 A1 | 6/2011 | Barnard |
| 2011/0236021 A1 | 9/2011 | Presi et al. |
| 2011/0274425 A1 | 11/2011 | Grobe |
| 2012/0183294 A1 | 7/2012 | Boertjes et al. |
| 2012/0201541 A1* | 8/2012 | Patel et al. .................. 398/58 |
| 2012/0251117 A1* | 10/2012 | Patel et al. .................. 398/79 |
| 2013/0156422 A1 | 6/2013 | Maeda et al. |
| 2013/0243416 A1 | 9/2013 | Dahlfort et al. |
| 2013/0336653 A1 | 12/2013 | Öhlén |
| 2014/0023372 A1* | 1/2014 | Sambo et al. .................. 398/79 |

FOREIGN PATENT DOCUMENTS

| | | | |
|---|---|---|---|
| WO | WO 2007048650 A1 | 5/2007 | |
| WO | WO 2010/025767 A1 | 3/2010 | |
| WO | WO 2012/025148 * | 3/2012 | ............ H04J 14/02 |

OTHER PUBLICATIONS

Shen et al: "From Coarse Grid to Mini-Grid to Gridless: How Much can Gridless Help Contentionless", OFC 2011, Mar. 6-10, 2011, paper OTu13, pp. 1-3.*

Acharya S. et al. "PESO: Low Overhead Protection for Ethernet over SONET Transport", INFOCOM 2004, the whole document.

Dahlfort S. et al. "Split Spectrum Approach to Elastic Optical Networking", ECOC 2012, the whole document.

ITU-T G.7042/Y.1305 (Mar. 2006), "Link capacity adjustment scheme (LCAS) for virtual concatenated signals", Mar. 2006, the whole document.

ITU-T G.707/Y.1322 (Jan. 2007), "Network node interface for the synchronous digital hierarchy (SDH)", Jan. 2007, the whole document.

Li Y. et al., "Flexible Grid Label Format in Wavelength Switched Optical Network draft-li-ccamp-flexible-grid-label-00", Network Working Group, Internet Draft, Jul. 4, 2011, the whole document.

Strasser T.A. et al. "Wavelength-Selective Switches for ROADM Applications", IEEE Journal of Selected Topics in Quantum Electronics, V. 16, N. 5, Sep./Oct. 2010, the whole document.

Jinno M., et al., "Spectrum-Efficient and Scalable Elastic Optical Path Network: Architecture, Benefits, and Enabling Technologies", IEEE Comm. Mag.,47(11), Nov. 2009, the whole document.

Gringeri St. et al., "Technical Considerations for Supporting Data Rates Beyond 100 Gb/s", IEEE Comm. Mag., Feb. 2012, the whole document.

Thiagarajan S. et al. "Spectrum efficient super-channels in dynamic flexible grid networks—a blocking analysis", OSA/OFC/NFOEC,2011, the whole document.

Patel A.N. et al., "Routing, Wavelength Assignment, and Spectrum Allocation in Wavelength-Convertible Flexible Optical WDM (WC-FWDM) Networks", Optical Fiber Communication Conference and Exposition (OFC/NFOEC), 2012, And The National Fiber Optic Engineers Conference, IEEE, Mar. 4, 2012, the whole document.

Patel A.N. et al., "Routing, Wavelength Assignment, and Spectrum Allocation Algorithms in Transparent Flexible Optical WDM Networks", Optical Switching and Networking, Elsevier, NL, Feb. 7, 2012, the whole document.

* cited by examiner

METHOD FOR ROUTING AND SPECTRUM ASSIGNMENT

PRIORITY CLAIM

The present application claims priority to U.S. Provisional Application No. 61/621,879 filed on Apr. 9, 2012.

TECHNICAL FIELD

The present invention relates generally to routing and spectrum assignment (RSA) in an optical wavelength division multiplexing (WDM) network and, more specifically, to spectrum allocation and route selection algorithms that achieve high spectral and computational efficiency.

BACKGROUND

Optical fiber offers higher bandwidth and faster data rates compared to copper cables. Optical fiber has traditionally been used in long-haul backbones of the Internet. Metro optical networks are also widely deployed for metropolitan-area networks. Recently, optical fiber networks are now reaching residential access networks that connect individual homes to a network carrier's central offices.

Different multiplexing techniques, for example, TDM or WDM, are used in optical networks to increase the capacity of the underlying optical fibers. A WDM optical network employs multiple wavelengths or a band of wavelengths for simultaneous data transmissions. A WDM optical network generally comprises a plurality of wavelength crossconnects (WXCs), also referred to as nodes. Each node is connected to one or more other nodes via optical links. Each node performs key functions such as wavelength multiplexing/demultiplexing, and switching. Each node may optionally perform wavelength conversion or optical/electrical/optical (OEO) conversion. If no wavelength conversion or optical/electrical/optical conversion is performed by a node connecting two adjacent optical links, the so-called wavelength continuity constraint applies to a spectrum resource allocated to carry data through these two adjacent optical links. The spectrum resource is required to be of the same wavelength and is available on both links.

In a WDM optical network without wavelength or OEO conversions, to transmit data from a source node to a destination node interconnected by multiple optical links, the network needs to configure a route between the two nodes and to assign a spectrum resource to accommodate the spectrum demand of the data transmission. The route would include various links that have the resource to support the spectrum demand. The algorithm used by the network to select a route and assign a spectrum is generally referred to as routing and spectrum assignment (RSA) algorithm.

In optical networks, one goal of RSA is to determine an optimal path between a source node and a destination node. An optimal path may be a path that is shortest in length, smallest in transmission delay, or lowest in cost, etc. Another goal of RSA is efficient use of spectrum resources. An ideal RSA scheme prevents spectrum fragmentation in which used and unused spectrum segments are interspersed. Spectrum fragmentation leads to wasted spectrum resources that are blocked and cannot be assigned. An ideal RSA scheme can achieve zero or low blocking ratio (the percentage of blocked spectrum in the band of frequencies).

However, a RSA algorithm that provides efficient use of spectrum resources is often computationally expensive. Also, as spectrum resources on optical fibers become scarce, it is critical to maximize their utilization by efficient provisioning strategies or allocation algorithms. There is a need for an advanced RSA algorithm that can achieve high spectrum efficiency with low computational complexities.

SUMMARY

The present invention provides methods and apparatus for assigning spectrum and selecting a route for a connection between a source node and a destination node within an optical network. The optical network is allocated an optical band of wavelengths or frequencies. The connection is used for transmitting a data signal between the two nodes. In the present application, wavelengths and frequencies are used interchangeably and refer to spectrum resources used for data transmission in an optical network.

The RSA methods disclosed in the present application avoid continuous frequency scanning and require consideration of only a limited number of spectrum assignment possibilities. Because there are only a few possibilities to consider, the RSA methods disclosed herein guarantee a complete search for optimum spectrum assignment and therefore improve computational efficiency. Also, a spectrum assignment made according to the RSA methods always adjoins a previous spectrum assignment, thus, substantially preventing spectrum fragmentation.

In some embodiments, the spectrum assignment and route selection method comprises determining a spectrum demand for a connection between a source node and a destination node. The source node and the destination node are connected by a plurality of optical links. The method further comprises identifying one or more potential spectrum allocations that satisfy the spectrum demand for the connection. The one or more potential spectrum allocations start at either the starting frequency of the optical band allocated to the network or an end of a previously allocated spectrum. The starting frequency can be the lowest or the highest frequency in the optical band. After the spectrum allocations have been identified, routes corresponding to each of the spectrum allocations can be determined. Among the multiple routes determined, an optimal route can be selected.

In some embodiments, the spectrum assignment and route selection method can be carried out by a path computation element. A path computation element may comprise an optical module for interfacing with the optical network and one or more processing circuits that are configured to perform spectrum assignment and route selection in accordance with the present disclosure.

Of course, the present disclosure is not limited to the features, advantages, and contexts summarized above, and those familiar with pre-distortion circuits and techniques will recognize additional features and advantages upon reading the following detailed description and upon viewing the accompanying drawings.

DETAILED DESCRIPTION

Figure 1:
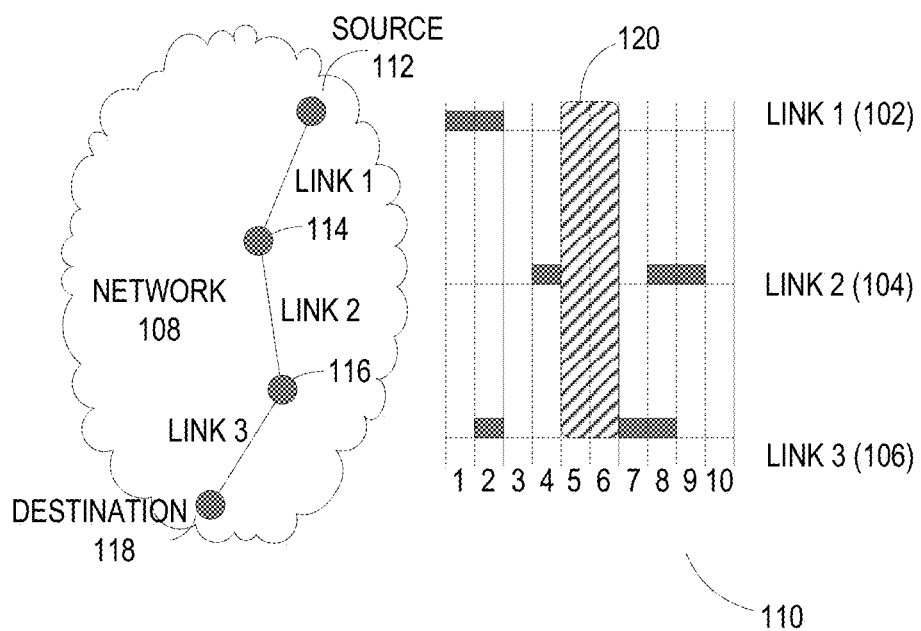
FIG. 1 illustrates a RSA algorithm using a spectrum grid.

Referring now to the drawings, FIG. 1 illustrates a RSA method using a spectrum grid. FIG. 1 depicts an optical network 108 and a spectrum grid 110. The optical network 108 comprises a source node 112, a destination node 118, and two intermediate nodes, 114 and 116. Three optical links, Link 1 (102), Link 2 (104), and Link 3 (106), interconnect the four nodes. The spectrum grid 110 represents the band of frequencies assigned to the optical network 108. The spectrum grid is divided into 10 spectrum slots, labeled 1, 2, 3 . . . 10. Each slot of spectrum represents the minimum unit of spectrum resources that can be assigned. The spectrum slots that have been assigned are shown as black. In FIG. 1, spectrum slots 1 and 2 have been assigned on Link 1 (102). On Link 2 (104), spectrum slots 4, 8, and 9 have been assigned. On Link 3 (106), spectrum slots 2, 7, and 8 have been assigned.

In FIG. 1, a generic RSA method is used to allocate spectrum resources and to select a route for a data transmission that requires a connection to be established between the source node 112 and the destination node 118. The spectrum demand for the connection is 2 spectrum units. In FIG. 1, the RSA algorithm relies on a fixed spectrum grid 110. The RSA method starts by examining every two adjacent spectrum slots and identifies those that are available on all three links. For example, in FIG. 1, there is only one possible spectrum allocation 120. The spectrum allocation 120 comprises spectrum slots 5 and 6 which are available on Links 1-3.

Using a spectrum grid in a RSA method improves computational efficiency as there are only a finite number of possibilities to examine and to select from. As shown in FIG. 1, there are only 10 possibilities to examine, namely, spectrum slots (1, 2), (2, 3), (3, 4) . . . (9, 10). However, because spectrum assignments are made in multiples of the minimum unit, spectral efficiency is often low for RSA methods using a spectrum grid.

Figure 2:
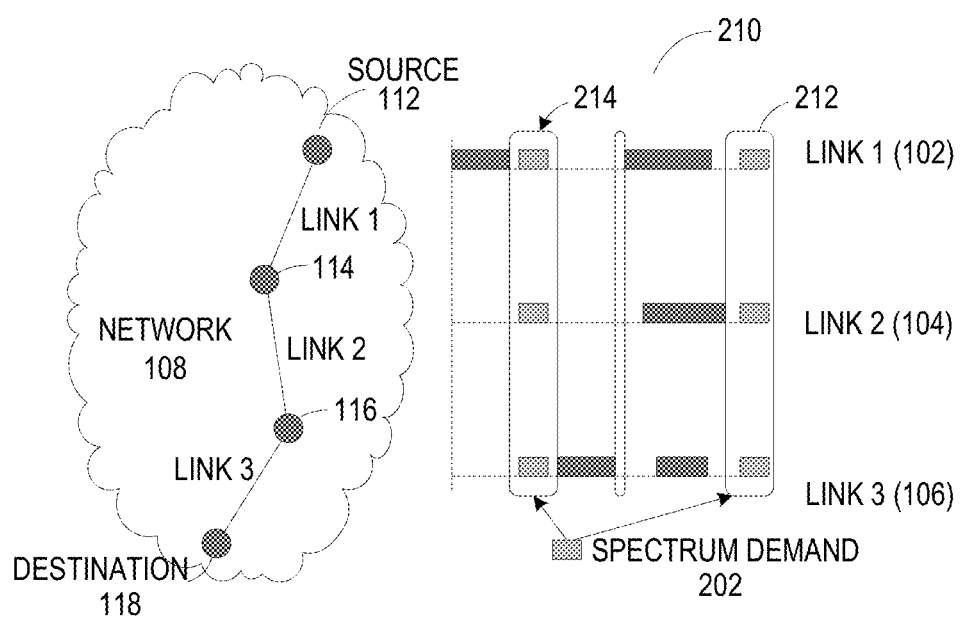
FIG. 2 illustrates a RSA algorithm without using a spectrum grid.

FIG. 2 illustrates a gridless RSA method for improved spectra efficiency. In FIG. 2, the optical network 108 is the same as in FIG. 1. For each optical link, the spectrum usage is shown in the spectrum graph 210. For example, on Link 1 (102), the two black segments indicate two assigned spectrum ranges. For Link 2 (104), there is only one assigned spectrum range and for Link 3 (106), there are two assigned spectrum ranges.

Instead of examining discrete units of spectrum resources, the gridless RSA method scans continuously through the band of frequencies to identify available spectrum resources for a connection. The connection requires a certain bandwidth of frequencies shown in FIG. 2 as a spectrum demand 202. As the spectrum is scanned, each spectrum slot that is wide enough to accommodate the spectrum demand 202 and is available on all three links is recorded. In the example shown in FIG. 2, spectrum slot 214 and spectrum slot 212 are shown as two possible spectrum allocations. Both satisfy the spectrum demand and are available on all three links. However, sliding spectrum slot 214 to the right by Δf would yield another possible allocation. Δf is an increment of any size in frequency. As Δf decreases, the spectrum allocation possibilities increase, resulting in increased computational complexity. While spectra efficiency increases without a grid, computational efficiency suffers due to the numerous possibilities that have to be examined.

Currently, ITU-T G.694.1 standards define a dense wavelength division multiplexing (DWDM) grid with a granularity of either 50 GHz or 100 GHz. For more efficient spectrum assignment, the granularity can be further reduced to 25 GHz, 12.5 GHz, or even 6.25 GHz. A finer granularity results in more possibilities of spectrum allocation with increased computational complexities.

Figure 3A:
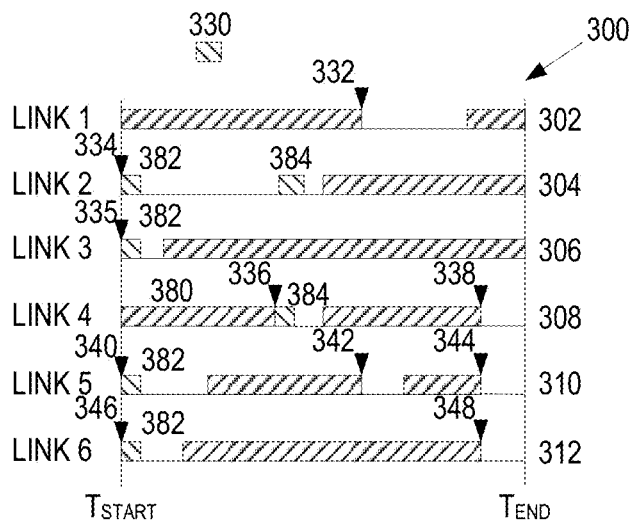
FIGS. 3A and 3B illustrate an exemplary embodiment of a RSA algorithm according to the claimed invention.

FIG. 3A depicts a gridless spectrum graph 300 similar to the graph 210 in FIG. 2. The spectrum graph 300 shows a spectrum resource ranging from $T_{START}$ to $T_{END}$ allocated to each of the six links, Link 1, Link 2 . . . Link 6. For each link, a current status of the spectrum usage is depicted. The black bar or bars on each line (302, 304 . . . , or 312) correspond to the assigned spectrum resources.

Figure 4:
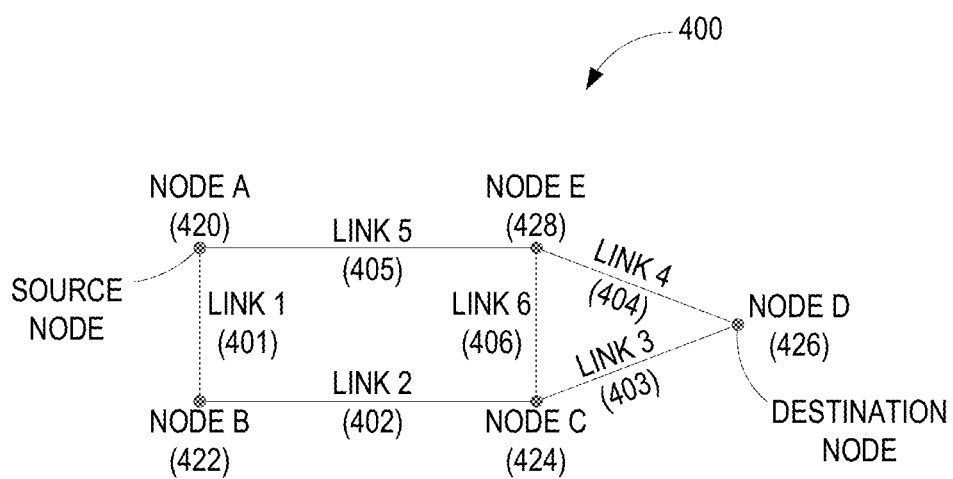
FIG. 4 illustrates an exemplary optical network comprising multiple nodes interconnected by optical links.

The spectrum graph 300 corresponds to a network 400 as shown in FIG. 4. In FIG. 4, the network 400 comprises five nodes, node A 420, node B 422, node C 424, node D 426, and node E 428. The network 400 also includes 6 links, Link 1 (401), Link 2 (402), Link 3 (403), Link 4 (404), Link 5 (405), and Link 6 (406). In the network 400, node A is the source node and node D is the destination node.

The RSA method according to the present disclosure is used to allocate spectrum resources for a connection through the network 400. The basic idea is to replace the continuous scanning approach used in the gridless RSA method with a new search method that identifies a finite number of discrete frequencies at which the most efficient assignment can be made. Once the spectrum demand of the connection is determined, the RSA algorithm proceeds by identifying the right end of each allocated spectrum for each link, which are marked by downward black arrows in the spectrum graph 300.

Then for each end point (marked by a black arrow), it is determined whether the available spectrum range contiguous with the allocated spectrum is large enough to satisfy the spectrum demand. If yes, the spectrum resource starting at the end of the previously allocated spectrum and having a width of the spectrum demand 330 is noted as a potential spectrum allocation. The link on which the end point lies is also marked as having sufficient capacity to support the potential spectrum allocation. For example, the end point 336 marks the end of the allocated spectrum 380 on Link 4 (308). The open range after the end point 336 is wide enough to accommodate the spectrum demand 330. Therefore, the spectrum range 384 is a potential spectrum allocation and Link 4 is also marked as having the sufficient capacity to support the potential spectrum allocation.

Figure 3B:
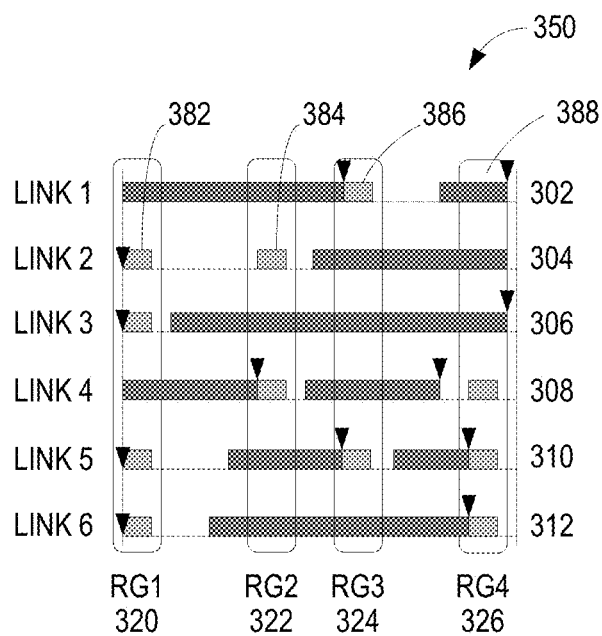

When a potential spectrum allocation is identified, all links that also have the capacity to support the potential spectrum allocation are identified. For example, for the potential spectrum allocation 384, Link 2 also has the requisite capacity. Once the links that can support the potential spectrum allocation are identified, a residual graph is created. For example, for the potential spectrum allocation 384, a residual graph, RG 2, can be formed. FIG. 3B shows all four possible residual graphs that can be formed from the spectrum graph of FIG. 3A.

The residual graph RG1 corresponds to the potential spectrum allocation 382 and includes four links, Link 2, Link 3, Link 5 and Link 6. The residual graph RG3 corresponds to the potential spectrum allocation 386 and includes Link 1 and Link 5. The residual graph RG 4 corresponds to the potential spectrum allocation 388 and includes three links, Link 4, Link 5, and Link 6.

Figure 5:
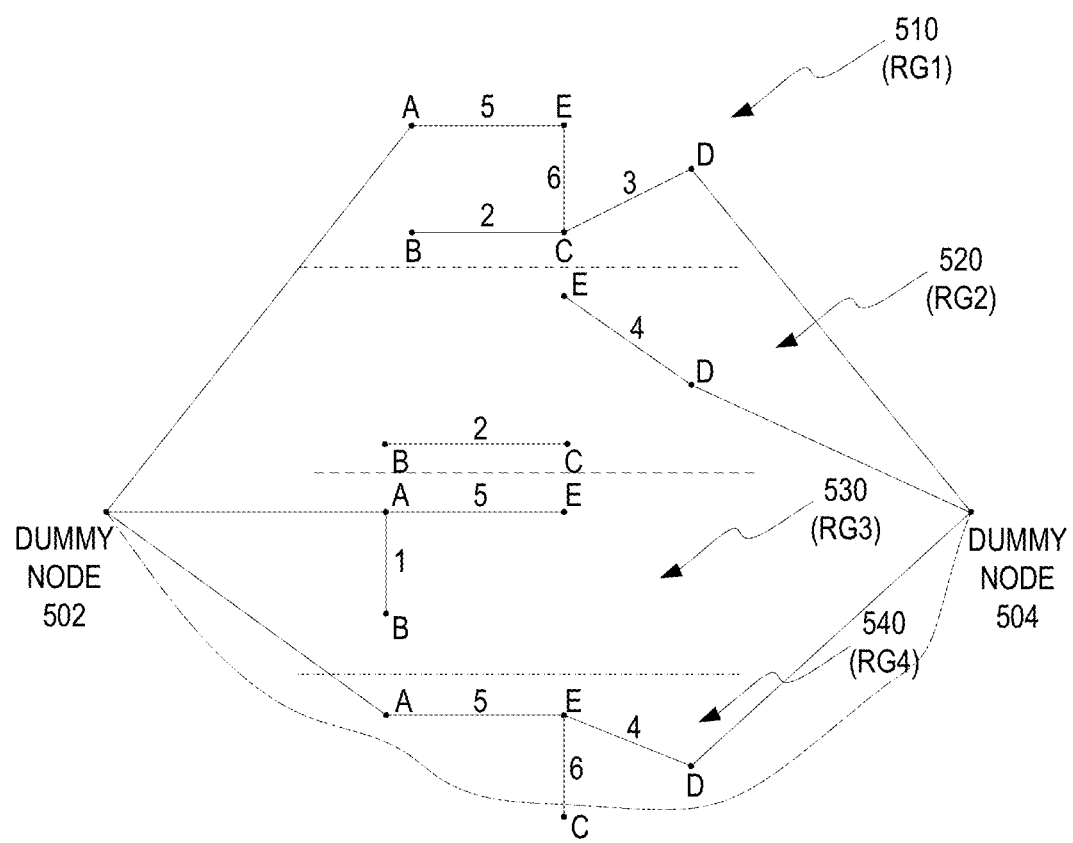
FIG. 5 illustrates an auxiliary graph used for a route selection algorithm.

After the residual graphs are defined, the next step is to identify the residual graphs that correspond to a feasible route, and to select one of the feasible routes. FIG. 5 illustrates an auxiliary graph 510 constructed for finding a suitable path. The auxiliary graph 510 is constructed based on the residual graphs shown in FIG. 3. The auxiliary graph 510 comprises four layers, with each layer corresponding to a residual graph. Two dummy nodes, 502 and 504, are added for connecting to the source node and the destination node.

In FIG. 5, layer 510 represents the residual graph RG1. The four links included in RG1 (Link 2, 3, 5, and 6) are shown in layer 510. Layer 520 represents the residual graph RG2 which includes only two links (Link 2 and 4). Layer 530 represents the residual graph RG3 which includes two links (Link 1 and 5) as well. RG4 is shown in layer 540 and includes three links (Link 4, 5, and 6).

Only routes that are connected between the two dummy nodes are feasible. For example, layer 520 does not contain a feasible route. Among the four layers shown in FIG. 5, there are only two feasible routes, the route shown in layer 510 corresponding to RG1 and the route shown in layer 540 corresponding to RG4. Between these two feasible routes, a better one may be selected based on a set of pre-defined criteria. The criteria may include being the shortest or the least costly, etc.

Suppose the criterion is the shortest route. In this case, the selected route represented by the residual graph RG4 is selected, since it comprises only three nodes, while the route represented by the residual graph RG1 comprises four nodes.

In cases in which there are multiple shortest paths, a second-order criterion can be used to select one among the multiple shortest paths. An example of a second-order criterion may be selecting a path with the lowest starting frequency. Selecting a path with the lowest starting frequency can prevent some links from being overloaded. For example, if one link has been selected as part of a shortest path several times in the past, the available spectrum resource on that link will be located at a relatively higher frequency, as compared to other links that have not been selected at all or as often. A second order criterion requiring a selection of a path with the lowest starting frequency will avoid this link that has been selected more often than other links.

Figure 6:
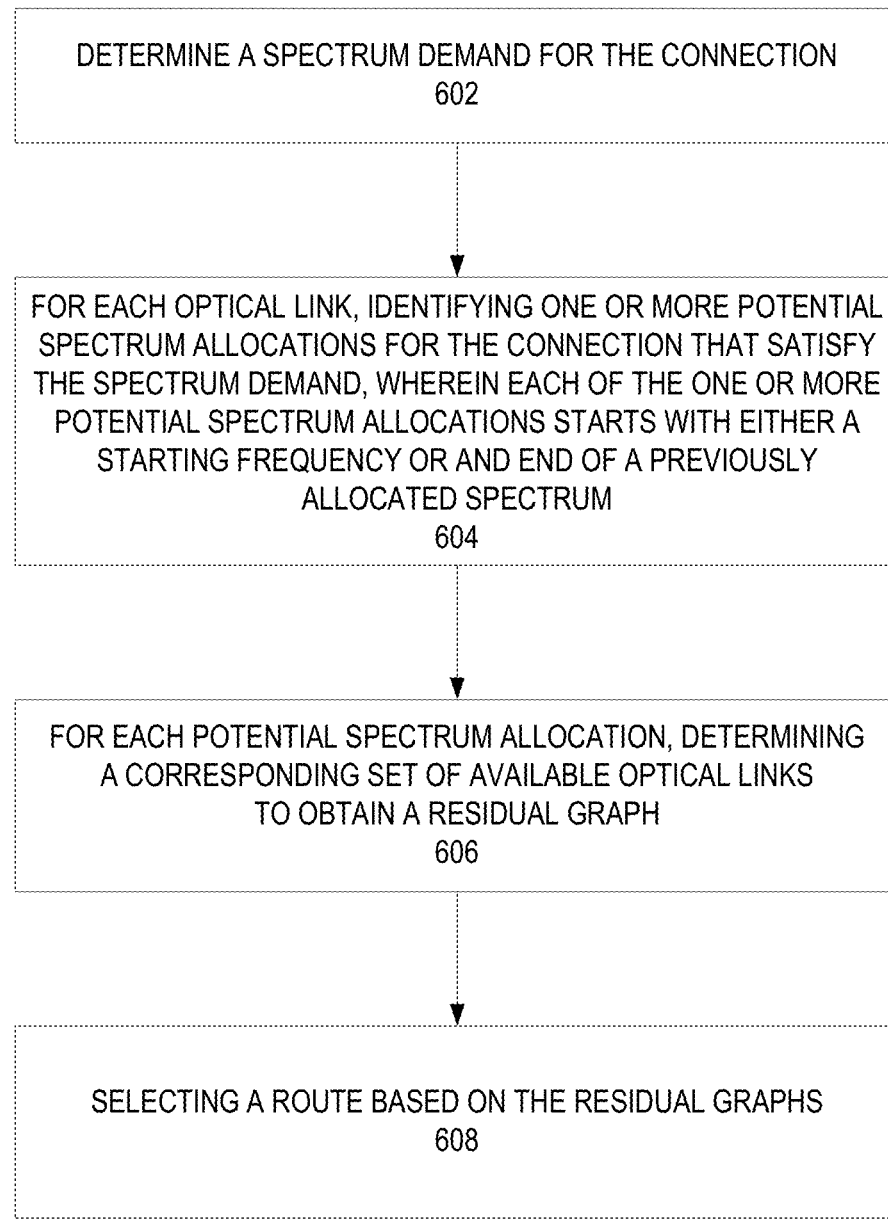
FIG. 6 illustrates a flowchart of an exemplary RSA algorithm.

FIG. 6 is a flowchart illustrating an exemplary RSA method in accordance with the techniques described above. The RSA method seeks to assign a spectrum resource and select a route for establishing a connection between two nodes in an optical network. Multiple optical links connect the two nodes.

In FIG. 6, a spectrum demand for the connection is first determined (step 602). Next, one or more potential spectrum allocations that satisfy the spectrum demand are identified for each optical link. Each of the one or more potential spectrum allocations starts with either a starting frequency or an end of a previously allocated spectrum (step 604). For each potential spectrum allocation, a corresponding set of available optical links are determined to obtain a residual graph (step 606). Among the set of residual graphs obtained for the one or more potential spectrum allocations, a route, for example, the shortest path is selected as the selected route between the source node and the destination node (step 608).

Figure 7:
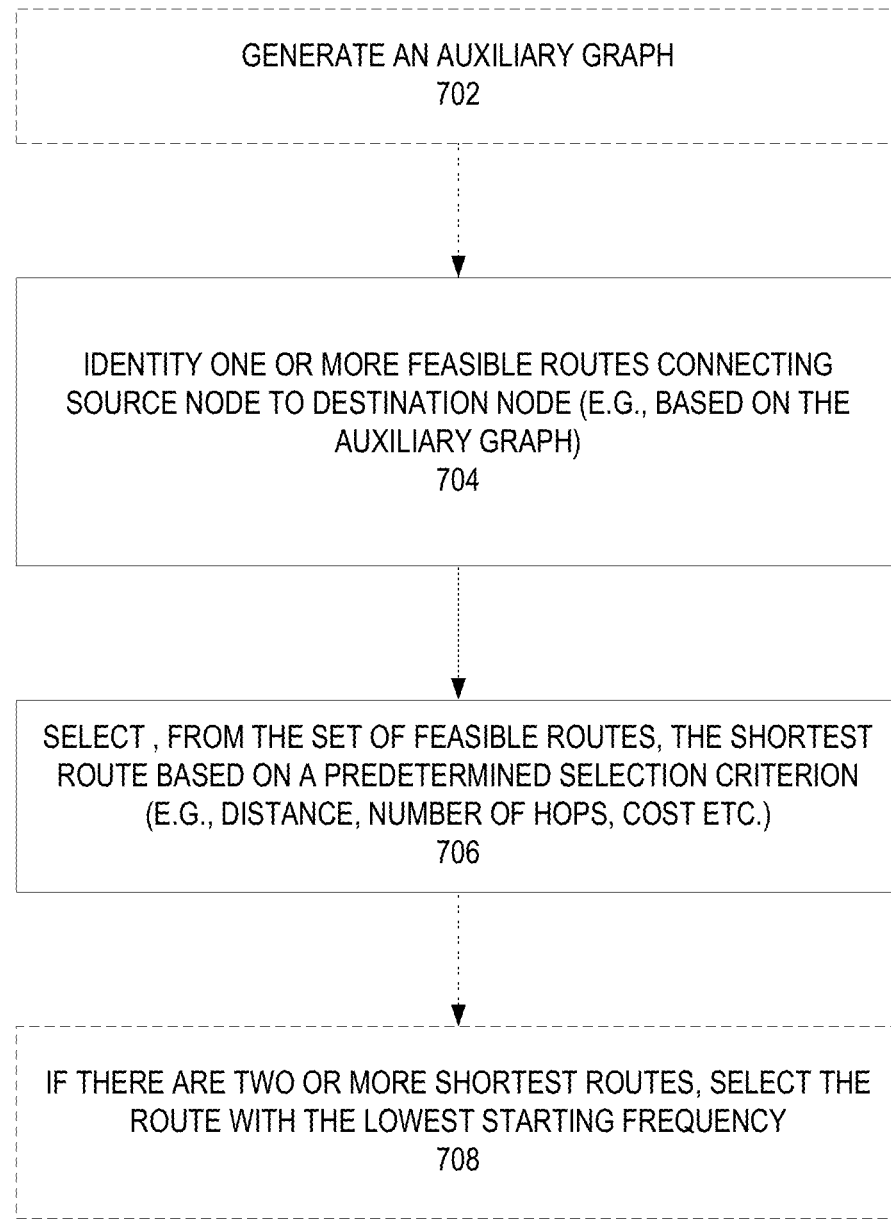
FIG. 7 illustrates a flowchart of an exemplary route-selection process.

The flowchart in FIG. 7 illustrates a route-selection process based on a pre-determined criterion. In FIG. 7, an auxiliary graph may be generated to facilitate the route-selection process (step 702). Step 702 is optional therefore is shown in a box of dotted lines. Tools or approaches other than auxiliary graphs may be used to identify feasible routes.

In step 704, one or more feasible routes connecting the source node (112) and the destination node (118) are identified, e.g., based on the auxiliary graph. From the one or more feasible routes, the shortest route is selected based on a predetermined selection criterion (step 706). For example, a predetermined selection criterion may be the route of the shortest distance, the fewest number of hops, or the least cost, etc. When two or more shortest routes are found in step 706, a second criterion, such as the lowest starting frequency, may be used to select one among the multiple shortest routes (step 708). Step 708 is an optional step as indicated by the box with dotted lines.

Figure 8:
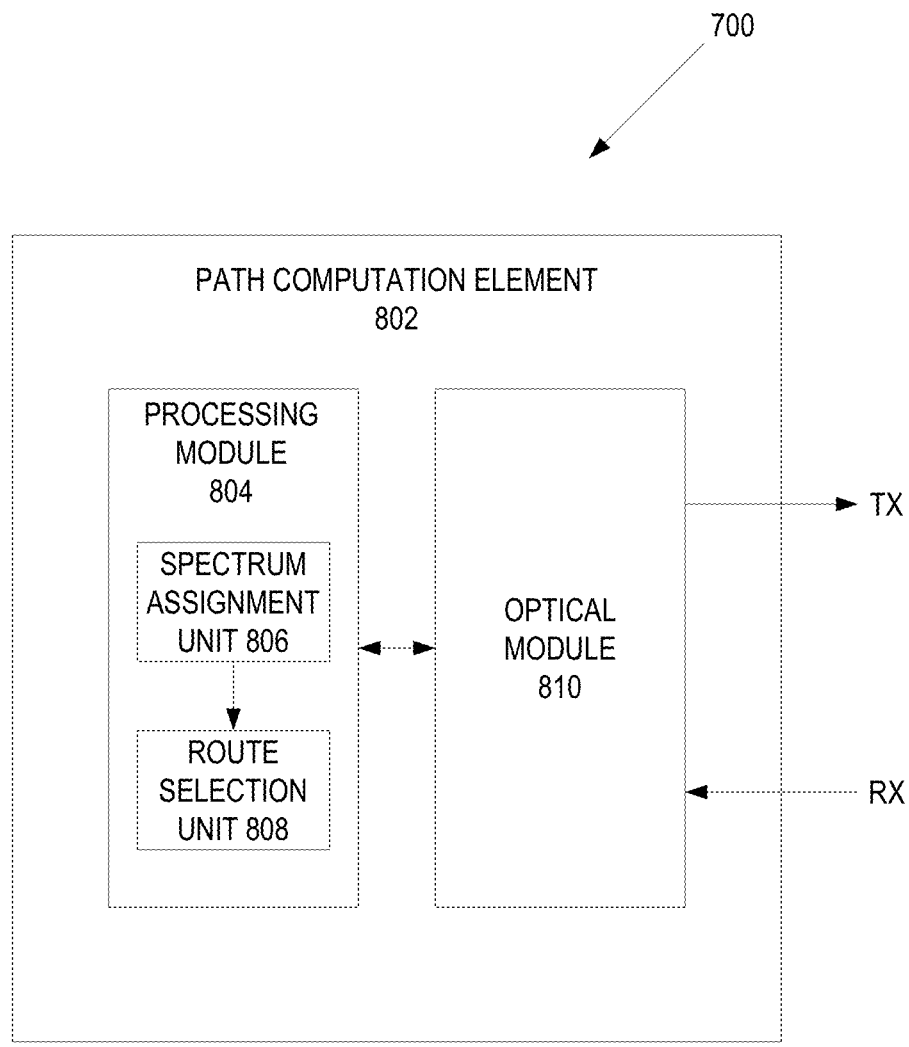
FIG. 8 illustrates an exemplary Path Computation Element configured to perform a route selection algorithm as described in the present disclosure.

FIG. 8 illustrates an exemplary Path Computation Element 802 configured to implement the RSA algorithm described in FIGS. 6 and 7. The Path Computation Element 802 includes a processing module 804 and an optical module 810. The optical module 810 provides an optical interface to the optical network. The optical module 810 receives and transmits data transmissions from the optical network. The processing module 804 is configured to implement the RSA method described in FIGS. 6 and 7. The processing module 804 includes a spectrum assignment unit 806 and a route selection unit 808. The spectrum assignment unit 806 is configured to determine the spectrum demand for a connection and to identify one or more potential spectrum allocations and their associated residual graphs. The route selection unit 808 is configured to determine one or more feasible routes among the residual graphs and select a route that satisfies a set of pre-defined criteria.

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of assigning spectrum and selecting a route for a connection between a source node and a destination node within an optical network, wherein a plurality of optical links connect the source node with the destination node, said method comprising:

determining a spectrum demand for the connection;

for each optical link, identifying, by a Path Computation Element, one or more potential spectrum allocations for the connection, each of the one or more potential spectrum allocations having a width equal to the spectrum demand, wherein each of said potential spectrum allocations starts with either a starting frequency of an optical band assigned to the optical network or an end of a previously allocated spectrum;

for each potential spectrum allocation, determining, by the Path Computation Element, a corresponding set of available optical links to obtain a residual graph that represents the residual capacity on each of the set of available optical links;

generating an auxiliary graph based on the residual graphs, wherein the auxiliary graph comprises one or more layers with each layer corresponding to a respective residual graph;

among all routes represented by the residual graphs, identifying one or more feasible routes that connect the source node and the destination node; and selecting a route among the one or more feasible routes based on the auxiliary graph.

2. The method of claim 1, wherein the spectrum demand comprises the frequency bandwidth required by the connection.

3. The method of claim 1, wherein identifying the one or more potential spectrum allocations for the connection that each satisfy the spectrum demand comprises on each optical link:
   identifying one or more spans of available spectrum that satisfy the spectrum demand; and
   within each of the one or more spans of available spectrum, determine a potential spectrum allocation that starts with either a starting frequency or an end of a previously allocated spectrum.

4. The method of claim 1, wherein the starting frequency corresponds to the lowest frequency in the optical band assigned to the optical network.

5. The method of claim 1, wherein the starting frequency corresponds to the highest frequency in the optical band assigned to the optical network.

6. The method of claim 1, wherein selecting a route based on the pre-defined criterion comprises selecting the shortest route among the one or more feasible routes.

7. The method of claim 1, wherein selecting a route based on the pre-defined criterion comprises selecting the lowest cost route among the one or more feasible routes.

8. The method of claim 1, further comprising selecting the route with the lowest starting frequency when two or more routes satisfy the predefined criterion.

9. A Path Computation Element configured to assign spectrum and select a route for a connection between a source node and destination node located in an optical network, said optical network comprising a plurality of optical links connecting the source node and the destination node, said Path Computation Element comprising:
   an optical module for interfacing with the optical network;
   one or more processing circuits configured to:
      determine a spectrum demand for the connection;
      for each optical link, identify one or more potential spectrum allocations for the connection, each of the one or more potential spectrum allocations having a width equal to the spectrum demand, wherein each of said potential spectrum allocations starts with either a starting frequency in an optical band assigned to the optical network or an end of a previously allocated spectrum;
      for each potential spectrum allocation, determine a corresponding set of available optical links to obtain a residual graph that represents the residual capacity on each of the set of available optical links;
      generate an auxiliary graph based on the residual graphs, wherein the auxiliary graph comprises one or more layers with each layer corresponding to a respective residual graph;
      identify, among all routes represented by the residual graphs, one or more feasible routes that connect the source node and the destination node; and
      select a route among the one or more feasible routes based on the auxiliary graph.

10. The Path Computation Element of claim 9, wherein the spectrum demand comprises the frequency bandwidth required by the connection.

11. The Path Computation Element of claim 9, wherein identifying the one or more potential spectrum allocations for the connection that each satisfy the spectrum demand comprises on each optical link:
   identifying one or more spans of residual spectrum that satisfy the spectrum demand; and
   within each of the one or more spans of residual spectrum, allocating a potential spectrum allocation that starts with either a starting frequency or an end of a previously allocated spectrum.

12. The Path Computation Element of claim 9, wherein the starting frequency corresponds to the lowest frequency in the optical band assigned to the optical network.

13. The Path Computation Element of claim 9, wherein the starting frequency corresponds to the highest frequency in the optical band assigned to the optical network.

14. The Path Computation Element of claim 9, wherein the one or more processing units are further configured to select a route based on the pre-defined criterion by selecting the shortest route among the one or more feasible routes.

15. The Path Computation Element of claim 9, wherein the one or more processing units are further configured to select a route based on the pre-defined criterion by selecting the lowest cost route among the one or more feasible routes.

16. The Path Computation Element of claim 9, wherein the one or more processing units are further configured to select the route with the lowest starting frequency when two or more routes satisfy the pre-defined criterion.

* * * * *